(12) United States Patent
Johri et al.

(10) Patent No.: US 10,399,557 B2
(45) Date of Patent: Sep. 3, 2019

(54) ENGINE/MOTOR TORQUE CONTROL FOR TORQUE HOLE FILLING IN A HYBRID VEHICLE DURING AUTOMATIC TRANSMISSION SHIFTING

(71) Applicant: Ford Global Techologies, LLC, Dearborn, MI (US)

(72) Inventors: Rajit Johri, Canton, MI (US); Christopher John Teslak, Plymouth, MI (US); Fazal Urrahman Syed, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 172 days.

(21) Appl. No.: 15/809,145

(22) Filed: Nov. 10, 2017

(65) Prior Publication Data
US 2019/0143960 A1 May 16, 2019

(51) Int. Cl.
*B60W 10/06* (2006.01)
*B60W 20/15* (2016.01)
(Continued)

(52) U.S. Cl.
CPC ............... *B60W 20/15* (2016.01); *B60K 6/48* (2013.01); *B60W 10/06* (2013.01); *B60W 10/08* (2013.01); *B60W 30/19* (2013.01); B60K 2006/4825 (2013.01); B60W 2510/1005 (2013.01); B60W 2510/244 (2013.01);
(Continued)

(58) Field of Classification Search
CPC ...... B60W 20/15; B60W 30/19; B60W 10/08; B60W 10/06; B60W 2510/1005; B60W 2710/083; B60W 2510/244; B60W 2710/0666; B60K 2006/4825; B60Y 2200/92; Y10S 903/93
See application file for complete search history.

(56) References Cited

U.S. PATENT DOCUMENTS 4,724,723 A 2/1988 Lockhart et al.
4,744,031 A 5/1988 Takeda et al.
(Continued)

FOREIGN PATENT DOCUMENTS

JP 05087227 4/1993

*Primary Examiner* — David J Hlavka
(74) *Attorney, Agent, or Firm* — David Kelley; Brooks Kushman P.C.

(57) ABSTRACT

A vehicle includes a motor between an engine and transmission and a controller configured to control motor and engine torque during an upshift to generate a reserve torque during a preparatory phase applied to the transmission during a torque phase. The controller increases engine torque for the reserve torque, and decreases motor torque such that combined engine and motor torque satisfy driver demanded torque without retarding spark when available motor torque is insufficient to provide the reserve torque. A method for controlling a vehicle having a motor connected between an engine and a transmission includes increasing engine torque for reserve torque to be applied during a torque phase of an upshift responsive to available motor torque being insufficient to satisfy the reserve torque, and reducing engine torque by retarding spark only if combined engine torque and motor torque exceeds driver demand torque after reducing motor torque to a minimum threshold.

20 Claims, 5 Drawing Sheets

(51) Int. Cl.
  *B60W 10/08* (2006.01)
  *B60W 30/19* (2012.01)
  *B60K 6/48* (2007.10)
(52) U.S. Cl.
  CPC .............. *B60W 2710/0666* (2013.01); *B60W 2710/083* (2013.01); *B60Y 2200/92* (2013.01); *Y10S 903/93* (2013.01)

(56) References Cited

U.S. PATENT DOCUMENTS

| | | | |
|---|---|---|---|
| 4,790,418 A | 12/1988 | Brown et al. | |
| 4,792,902 A | 12/1988 | Hrovat et al. | |
| 4,855,914 A | 8/1989 | Davis et al. | |
| 5,058,015 A | 10/1991 | Leorat | |
| 5,092,182 A | 3/1992 | Ikeda et al. | |
| 5,105,357 A | 4/1992 | Steeby | |
| 5,133,227 A | 7/1992 | Iwatsuki | |
| 5,165,286 A | 11/1992 | Hamamura et al. | |
| 5,188,005 A | 2/1993 | Sankpal et al. | |
| 5,573,477 A | 11/1996 | Desautels et al. | |
| 5,669,851 A | 9/1997 | Tietze | |
| 5,839,987 A | 11/1998 | Sawamura et al. | |
| 5,899,286 A | 5/1999 | Yamaguchi | |
| 6,047,605 A | 4/2000 | Garshelis | |
| 6,145,387 A | 11/2000 | Garshelis | |
| 6,243,637 B1 | 6/2001 | Minowa et al. | |
| 6,246,941 B1 | 6/2001 | Sayman | |
| 6,260,423 B1 | 7/2001 | Garshelis | |
| 6,278,926 B1 | 8/2001 | Jain et al. | |
| 6,482,125 B2 | 11/2002 | Urasawa | |
| 6,487,925 B2 | 12/2002 | Fischer et al. | |
| 6,490,934 B2 | 12/2002 | Garshelis | |
| 6,553,847 B2 | 4/2003 | Garshelis | |
| 6,698,299 B2 | 3/2004 | Cripe | |
| 6,846,260 B2 | 1/2005 | Horiuchi | |
| 6,949,051 B2 | 9/2005 | Takeji | |
| 6,969,340 B2 | 11/2005 | Tokura et al. | |
| 6,991,584 B2 | 1/2006 | Cowan | |
| 7,178,618 B2 | 2/2007 | Komeda et al. | |
| 7,243,557 B2 | 7/2007 | May | |
| 7,300,381 B2 | 11/2007 | Badillo et al. | |
| 7,351,183 B2 | 4/2008 | Fujii et al. | |
| 7,478,572 B2 | 1/2009 | Maten et al. | |
| 7,503,875 B2 | 3/2009 | Fujii et al. | |
| 8,290,668 B2 | 10/2012 | Hirasako et al. | |
| 8,808,141 B2 | 8/2014 | Shelton et al. | |
| 9,067,587 B1 | 6/2015 | Johri et al. | |
| 9,260,102 B2 | 2/2016 | Teslak et al. | |
| 2002/0025885 A1 | 2/2002 | Saito et al. | |
| 2004/0242374 A1 | 12/2004 | Wheals | |
| 2006/0135316 A1 | 6/2006 | Fujii et al. | |
| 2006/0154781 A1 | 7/2006 | Petzold et al. | |
| 2008/0139362 A1 | 6/2008 | Fujii et al. | |
| 2009/0171545 A1 | 7/2009 | Shimizu et al. | |
| 2010/0248893 A1* | 9/2010 | Shimanaka | B60K 6/48 477/5 |
| 2010/0292901 A1 | 11/2010 | Ortmann et al. | |
| 2010/0318269 A1 | 12/2010 | Yanakiev et al. | |
| 2011/0184612 A1 | 7/2011 | Fujii et al. | |
| 2012/0130608 A1 | 5/2012 | Fujii et al. | |
| 2012/0130610 A1 | 5/2012 | Lee et al. | |
| 2013/0158766 A1* | 6/2013 | Okuda | B60K 6/48 701/22 |
| 2013/0296127 A1* | 11/2013 | Shelton | B60W 20/10 477/5 |
| 2018/0251117 A1* | 9/2018 | Yamazaki | B60W 20/15 |

* cited by examiner

ENGINE/MOTOR TORQUE CONTROL FOR TORQUE HOLE FILLING IN A HYBRID VEHICLE DURING AUTOMATIC TRANSMISSION SHIFTING

TECHNICAL FIELD

This disclosure relates to controlling engine torque and electric motor torque of a hybrid vehicle to provide torque hole filling during shifting of an automatic transmission.

BACKGROUND

A step-ratio or multiple-ratio automatic transmission in a vehicle powertrain utilizes various friction elements for automatic gear ratio shifting. The friction elements establish power flow paths from a torque source such as an internal combustion engine and/or a traction motor to vehicle traction wheels. The overall transmission speed ratio, which is the ratio of a transmission input shaft speed to a transmission output shaft speed, is reduced as the transmission upshifts through the various available gear ratios.

In the case of a synchronous upshift, an off-going clutch (OGC) is released while an on-coming clutch (OCC) is engaged to lower a transmission gear ratio and change the torque flow path through the transmission. A typical upshift event is divided into a preparatory phase, a torque phase, and an inertia phase. During the preparatory phase, the OCC is stroked to prepare for its engagement while the OGC torque-holding capacity is reduced as a step toward its release. During the torque phase, which may also be referred to as a torque transfer phase, the OGC torque is reduced toward a value of zero or an insignificant level to prepare for disengagement. Simultaneously, the OCC torque is raised from an insignificant level to initiate engagement of the OCC according to a conventional upshift control strategy. The timing of the OCC engagement and the OGC disengagement results in a momentary activation of two torque flow paths through the gearing, which may cause torque delivery to drop momentarily at the transmission output shaft. This condition, which can be referred to as a "torque hole," may occur before disengagement of the OGC. A vehicle occupant may perceive a "torque hole" as an undesirable shift shock. When the OCC develops enough torque, the OGC is released, marking the end of the torque phase and the beginning of the inertia phase. During the inertia phase, the OCC torque is adjusted to reduce its slip speed toward zero. When the OCC slip speed reaches zero, the shift event is completed.

Torque hole filling is a control strategy that attempts to reduce and/or eliminate the transmission output torque hole during an upshift event. Control strategies for reducing torque disturbances include providing an increase in transmission input torque during the torque phase of the upshift. The increase in transmission input torque must be synchronized with the OCC and OGC to deliver a consistent shift feel. Various techniques and/or strategies may be used to increase transmission input torque from the engine or the electric motor. While electric motor torque can be increased nearly instantaneously when torque is available, engine torque is generally slower to respond due to the system dynamics of fuel and airflow. An engine torque increase may be initiated in anticipation of a transmission upshift by opening a throttle and providing additional fuel. The throttle may be opened more than required to achieve driver demand torque with spark retard used to maintain the desired torque so subsequent advancing of spark timing may be used to provide a faster torque increase during torque hole filling. This strategy creates a torque reserve where the engine can quickly provide more transmission input torque. However, there are various limitations associated with use of this approach; for example, external conditions (e.g., high altitude) may prevent the engine from creating the desired torque reserve, which would reduce the overall effectiveness of the torque hole filling strategy. Similarly, increased fueling of the engine with spark retard to provide a torque reserve may adversely impact fuel economy and feedgas emissions.

SUMMARY

In one or more embodiments, a vehicle includes an engine, an electric machine selectively coupled to the engine by a first clutch, an automatic step-ratio transmission selectively coupled to the electric machine by a second clutch, and a controller configured to control the engine and the electric machine during an upshift of the automatic transmission to generate a reserve torque during a preparatory phase of the upshift that is applied to the transmission during a torque phase of the upshift. The controller increases electric machine torque to provide the reserve torque if available electric machine torque is sufficient to satisfy the reserve torque. If available electric machine torque is insufficient to satisfy the reserve torque. the controller increases engine torque and reduces electric machine torque to reduce combined engine and electric machine torque to a driver demand torque, and retards spark to reduce engine torque during the preparatory phase only if the combined engine and electric machine torque exceeds driver demand torque after reducing electric machine torque to a minimum torque threshold. The controller may control the engine and/or motor torque using an open-loop control strategy so that additional torque sensors are not required for closed-loop control. Alternatively, a closed-loop or hybrid strategy may be employed using an observer based on operating parameters other than engine or motor torque.

In one or more embodiments, a vehicle includes a motor disposed between an engine and a transmission, and a controller configured to control motor and engine torque during an upshift to generate a reserve torque during a preparatory phase applied to the transmission during a torque phase of the upshift, the controller increasing engine torque for the reserve torque when available motor torque is insufficient, and decreasing motor torque such that combined engine and motor torque satisfy driver demanded torque.

A method of controlling a vehicle having a motor disposed between an engine and an automatic transmission according to one or embodiments includes increasing engine torque for reserve torque to be applied during a torque phase of an upshift responsive to available motor torque being insufficient to satisfy the reserve torque, and reducing engine torque by retarding spark only if combined engine torque and motor torque exceeds driver demand torque after reducing motor torque to a minimum threshold.

Embodiments according to the present disclosure may provide various advantages. For example, various embodiments coordinate engine and motor torque during upshifts to provide torque hole filling to reduce torque disturbances transmitted from the powertrain to the vehicle body, which reduces or eliminates undesirable shift shock. Further, providing motor torque priority for torque hole filling may improve overall powertrain efficiency. Similarly, retarding spark to reduce engine torque during the preparatory phase only if combined engine and motor torque exceeds driver demand torque after reducing motor torque to a minimum may also improve powertrain efficiency and reduce feedgas emissions. One or more embodiments may control engine and/or motor torque without using a torque sensor to reduce part count and associated cost.

The above advantages and other advantages and features will be readily apparent from the following detailed description when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1A:
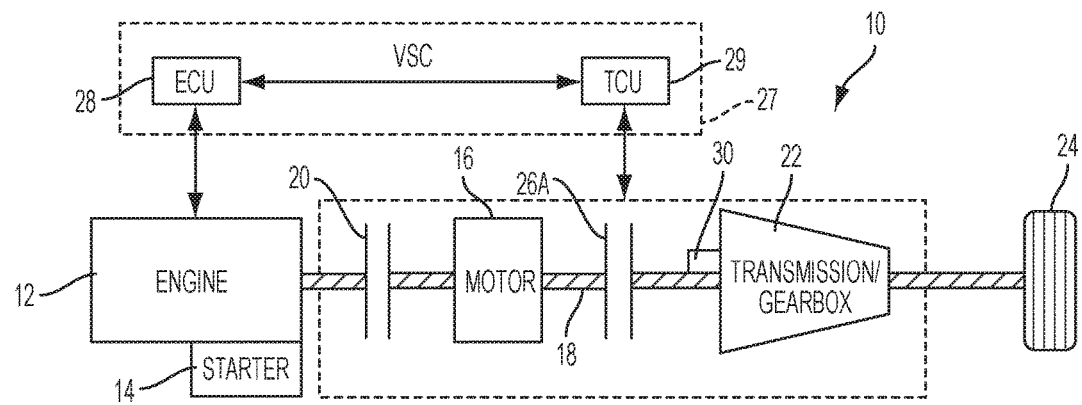
FIG. 1A is a schematic representation of a hybrid vehicle having an automatic transmission that does not include a torque converter in accordance with one or more embodiments.
Figure 1B:
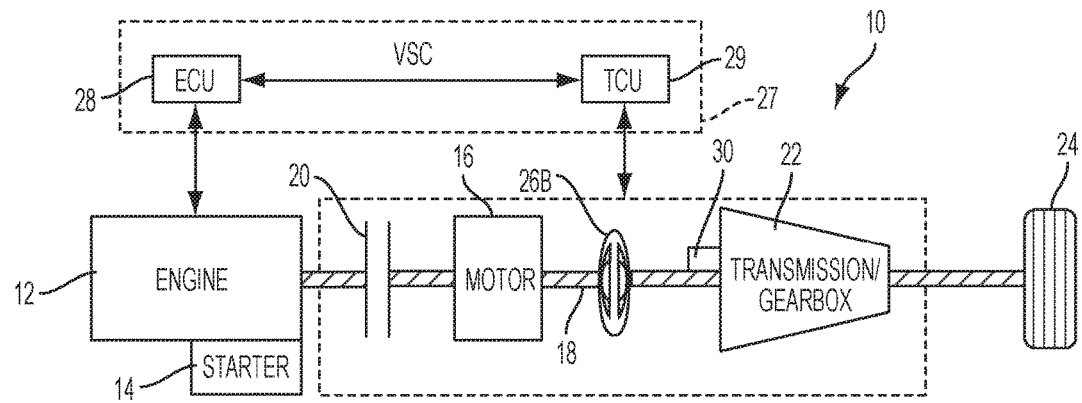
FIG. 1B is a schematic representation of a hybrid vehicle having an automatic transmission including a torque converter and bypass clutch in accordance with one or more embodiments.

As illustrated in the representative diagrams of FIGS. 1A and 1B, a hybrid vehicle may include an electric machine or traction motor disposed between an automatic transmission and an engine. This arrangement is sometimes referred to as a Modular Hybrid Transmission (MHT) arrangement. The engine may be selectively coupled to the traction motor and the automatic transmission by a first clutch or disconnect clutch. The disconnect clutch may allow the vehicle to operate in an electric-only drive mode with the traction motor acting as the primary power source (engine disconnected), in a hybrid mode with both the traction motor and the engine propelling the vehicle, and/or in an engine-only mode in which the vehicle is propelled by the engine alone. A second clutch or launch clutch may be provided to selectively couple the traction motor to the automatic transmission.

Referring to FIGS. 1A and 1B, a schematic representation of a vehicle 10 is shown. An engine 12 may be operatively connected to a starter motor 14 that may be used to crank and start the engine 12 under certain operating conditions. An electrical machine or traction motor 16, may be operatively connected to a driveline 18 and positioned between the engine 12 and the automatic step-ratio gearbox or transmission 22. The engine 12 may be selectively coupled to the motor 16 and the transmission 22 by a disconnect clutch 20. Torque generated by engine 12 and motor 16 may be provided through the driveline 18 to the transmission 22, which provides torque to drive the wheels 24.

As shown in FIG. 1A, a launch clutch 26A may be provided between the transmission 22 and the engine 12 and/or motor 16 to selectively couple torque through the transmission 22 to the wheels 24. Likewise, as shown in FIG. 1B, a torque converter 26B having a bypass clutch may be provided between the transmission 22 and the engine 12 and/or motor 16 to provide torque through the transmission 22 to the wheels 24. While elimination of the torque converter is an advantage of the embodiment of FIG. 1A, the present disclosure is also advantageous in reducing vibrations in systems having a torque converter 26B like that shown in the embodiment of FIG. 1B.

The vehicle may include a controller 27, such as a vehicle system controller (VSC), for controlling various vehicle systems and subsystems. The controller 27 may include various types of computer readable storage media to implement volatile and/or persistent memory. Controller 27 is in communication with one or more sensors 30 and actuators (not shown). Sensor(s) 30 may be implemented by a torque sensor positioned to measure an input torque of transmission 22. Torque sensor 30 may be implemented by a strain-gauge based system, a piezoelectric load cell, or a magneto-elastic torque sensor, for example.

In one embodiment, controller 27 is a VSC that includes an engine control unit (ECU) 28 and a transmission control unit (TCU) 29. The ECU 28 is electrically connected to the engine 12 for controlling the operation of the engine 12. The TCU 29 is electrically connected to and controls the motor 16 and the transmission 22. The ECU 28 is in communication with the TCU 29 and other controllers (not shown) over a vehicle network using a common bus protocol (e.g., CAN), in accordance with one or more embodiments. Although the illustrated embodiment depicts the VSC 27 functionality for controlling the powertrain as being contained within two controllers (ECU 28 and TCU 29), other embodiments of the hybrid vehicle may include a single VSC controller and/or any other combination of controllers for controlling the powertrain.

The shifting of an automatic transmission is accompanied by applying and/or releasing multiple friction elements (such as plate clutches, band-brakes, etc.) that change speed and torque relationships by altering gear configurations. Friction elements may be actuated electrically, hydraulically, mechanically or through other strategies using one or more associated actuators that may be in communication with a microprocessor-based controller implementing a particular control strategy based on signals received from one or more sensors. A realizable combination of gear configurations determines a total number of ratio steps. Although various planetary and lay-shaft gear configurations are found in modern automatic transmissions, the basic principle of shift kinematics is similar.

During a typical synchronous upshift event from a lower gear configuration to a higher gear configuration, both the gear ratio (defined as automatic transmission input shaft speed/output shaft speed) and the torque ratio (defined as automatic transmission output shaft torque/input shaft torque) become lower. During the upshift event, a friction element (referred to as an off-going clutch (OGC)) associated with the lower gear configuration disengages while a different friction element (referred to as an on-coming clutch (OCC)) associated with a higher gear configuration engages.

As described in greater detail below, in one embodiment, controller 27 controls engine 12 and motor 16 during an upshift of transmission 22 to provide torque hole filling by increasing engine torque from engine 12 for reserve torque to be applied during a torque phase of an upshift responsive to available motor torque from motor 16 being insufficient to satisfy the reserve torque, and reducing engine torque by retarding spark only if combined engine torque and motor torque exceeds driver demand torque after reducing motor torque to a minimum threshold.

Figure 2:
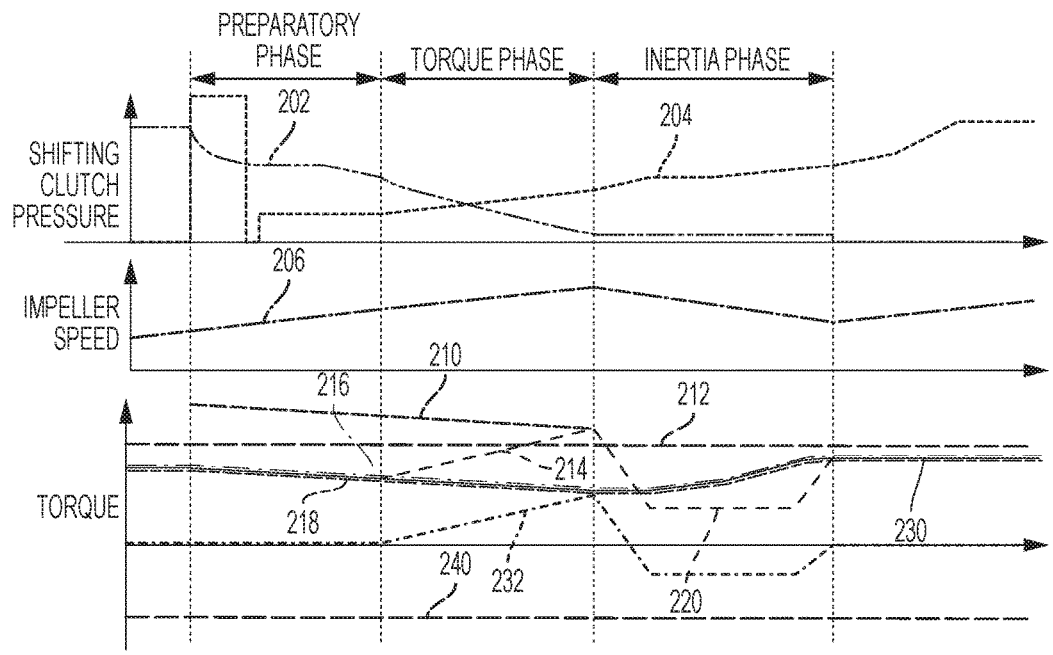
FIG. 2 illustrates control of engine and motor torque during an upshift using only motor torque for reserve torque to provide torque hole filling.
Figure 3:
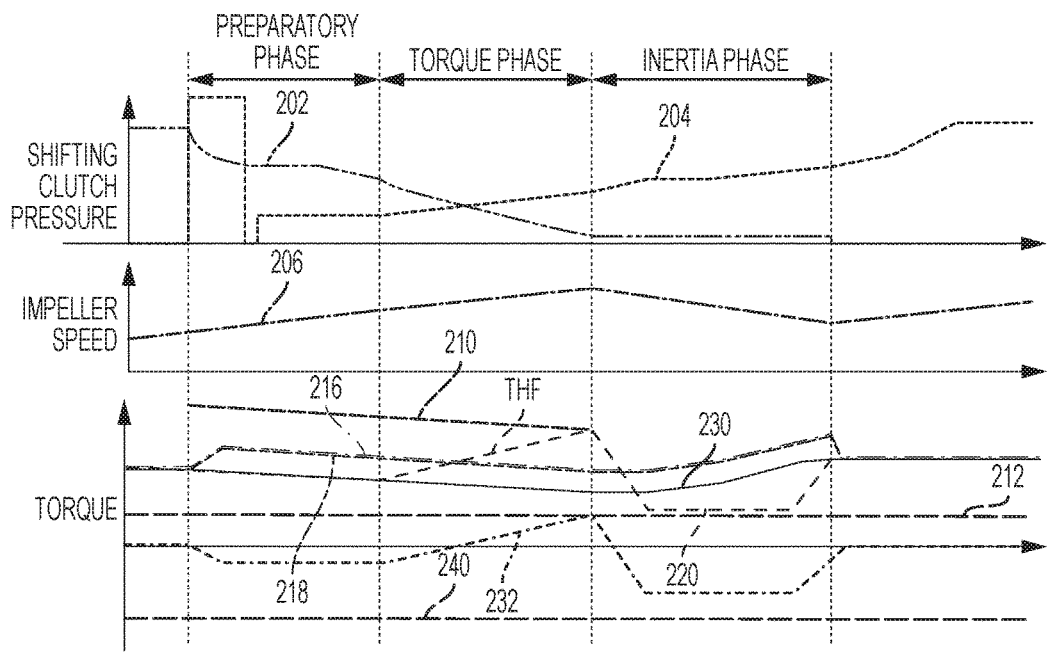
FIG. 3 illustrates control of engine and motor torque during an upshift using both motor torque and engine torque for reserve torque to provide torque hole filling, with motor torque reduction to reduce combined torque to driver demand torque.
Figure 4:
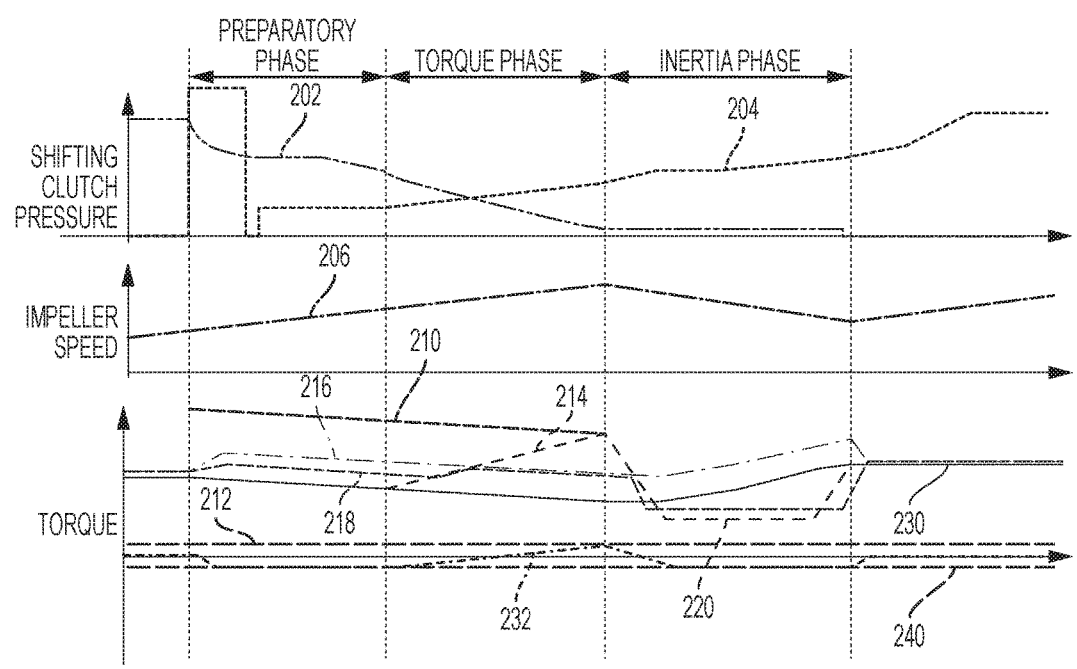
FIG. 4 illustrates control of engine and motor torque during an upshift using both motor torque and engine torque for reserve torque to provide torque hole filling, with motor torque reduction and spark retard to reduce combined torque to driver demand torque.

In various embodiments, controller 27 is configured to control the engine 12 and the electric machine 16 during an upshift of the automatic transmission 22 to generate a reserve torque during a preparatory phase of the upshift that is applied to the automatic transmission 22 during a torque phase of the upshift as illustrated in FIGS. 2-4. The controller 27 is configured to increase electric machine torque from electric machine 16 to provide the reserve torque if available electric machine torque is sufficient to satisfy the reserve torque. If available electric machine torque from electric machine 16 is insufficient to satisfy the reserve torque, controller 27 increases engine torque from the engine 12 and reduces electric machine torque from electric machine 16 to reduce combined engine and electric machine torque to a driver demand torque. Controller 27 may also retard spark to reduce engine torque from engine 12 during the preparatory phase only if the combined engine and electric machine torque exceeds driver demand torque after reducing electric machine torque to a minimum torque threshold.

FIGS. 2-4 illustrate various vehicle operating parameters during representative upshifts of automatic transmission 22 with controller 27 controlling engine and motor torque to provide a reserve torque during a preparatory phase for use during a torque phase to provide torque hole filling according to representative embodiments. FIG. 2 illustrates control of engine and motor torque during an upshift using only motor torque for reserve torque to provide torque hole filling. FIG. 3 illustrates control of engine and motor torque during an upshift using both motor torque and engine torque for reserve torque to provide torque hole filling, with motor torque reduction to reduce combined torque to driver demand torque. FIG. 4 illustrates control of engine and motor torque during an upshift using both motor torque and engine torque for reserve torque to provide torque hole filling, with motor torque reduction and spark retard to reduce combined torque to driver demand torque.

As shown in FIGS. 2-4, shifting clutch pressure is reduced for off-going clutch (OGC) 202 during the preparatory phase while clutch pressure to oncoming clutch (OCC) 204 is increased, which continues through the torque phase to the inertia phase at which point OCC 204 transfers all the torque and OGC has been reduced to zero torque. Torque converter impeller speed 206 increases through the preparatory phase and torque phase and decreases during the inertia phase until the shift is completed. Line 210 represents a projected maximum torque hole filling torque applied during the preparatory and torque phases. Lines 212 and 240 represent respective maximum and minimum motor torque limits or thresholds that may vary based on current operating conditions as shown in the representative operating conditions of FIGS. 2, 3, and 4.

With continuing reference to FIGS. 2-4, line 214 represents the torque hole filling torque with torque modulation indicated by reference numeral 220. Line 216 represents the engine base torque request. Line 218 represents the engine instantaneous torque request. Line 230 represents the driver demand torque (at the impeller or transmission input). Line 232 represents the motor torque request, which is subject to the motor maximum torque limit or threshold 212 and minimum torque limit or threshold 240.

As shown in FIG. 2, available motor torque is sufficient to satisfy the reserve torque or requested torque hole filling torque. As such, only motor is used to fill the torque hole fill request as the motor is capable of meeting the additional torque request. There is no change in engine torque during the preparatory phase of the upshift. Because the motor torque can be increased nearly instantaneously, the reserve torque during the preparatory phase is simply a determination by the controller that the motor has sufficient available torque for use during the torque phase to provide torque hole filling. The motor torque is then commanded to increase during the torque phase to provide the torque hole filling. Engine base torque and instantaneous requested torque will match driver demanded torque and no spark retard is used to reduce engine torque and associated combined engine and motor torque.

In FIG. 3, the controller determines that available motor torque is insufficient to satisfy the requested torque hole filling or reserve torque. As such, a combination of motor and engine torque is used to provide torque hole filling during the torque phase because available motor torque alone is not capable of meeting the additional torque request. The engine torque is increased in the preparatory phase so that the combined engine and motor torque satisfy the reserve torque to be delivered during the torque phase. The motor torque is reduced during the preparatory phase to offset the increased engine torque to maintain (i.e. not exceed) driver demand torque at the transmission input (impeller torque). Note, there is no spark retard applied, and engine instantaneous and base torques are approximately equal.

In FIG. 4, a combination of motor and engine torque is used to satisfy the reserve torque because available motor torque is insufficient to meet the additional torque request. The engine torque is increased in the preparatory phase similar to FIG. 3 to satisfy the torque reserve to be applied during the torque phase. The motor torque is reduced during the preparatory phase in an attempt to offset the increase in the engine torque so that input torque to the transmission does not exceed driver demand. However, reducing the motor torque to the minimum torque limit or threshold (which may be zero) is insufficient to achieve the desired torque reduction in the combined engine and motor torque. As such, the controller retards spark to further reduce engine torque so that the combined engine and motor torque does not exceed the driver demand torque. Spark timing may then be advanced and/or modulated by the controller during the torque phase to deliver the reserve torque to the transmission input to provide torque hole filling. Use of spark retard only after the motor torque has been reduced to a minimum limit or threshold may improve overall system efficiency and reduce feedgas emissions to the vehicle emission control system.

In the operating scenarios illustrated in FIGS. 3 and 4, the available motor torque is capable of partially meeting the requested or desired reserve torque for torque hole filling. The engine base torque and instantaneous requested torque will exceed driver demanded torque by a portion of reserve torque that exceeds the available motor torque. To maintain desired driver demand torque at the input of transmission, a torque reduction from the motor is requested as shown in FIG. 3. If the motor torque has been reduced to the minimum motor torque limit or threshold (which may be zero) and the combined motor and engine torque still exceeds the driver demand torque, only then is spark retard used to further reduce engine torque during the preparatory phase as shown in FIG. 4.

Figure 5:
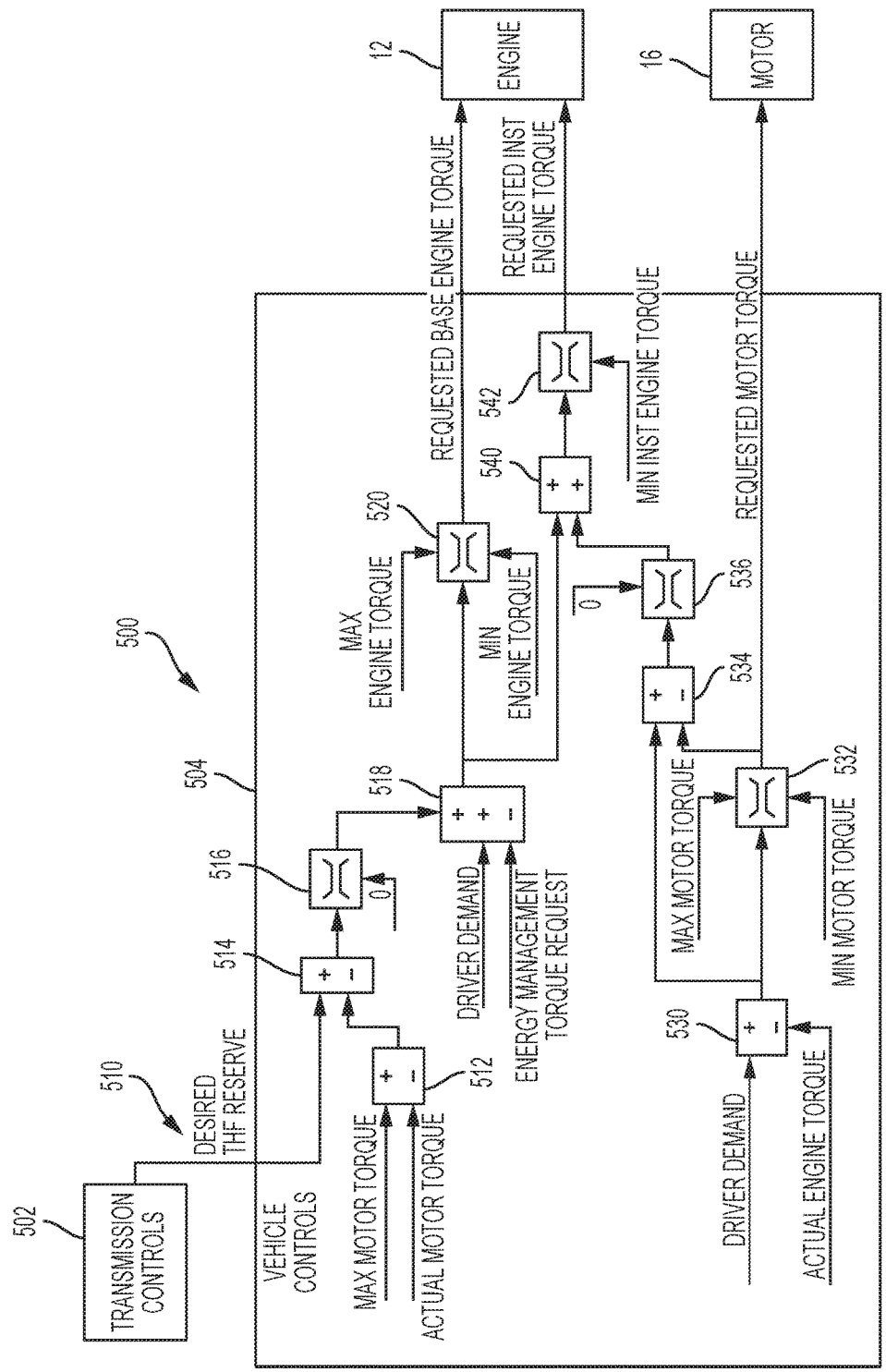
FIG. 5 is a block diagram illustrating a control system and/or algorithm for controlling motor torque and engine torque during an upshift for generating reserve torque during the preparatory phase to be applied to the transmission during the torque phase.

FIG. 5 is a block diagram illustrating a control system and/or algorithm 500 for controlling motor torque and engine torque during an upshift for generating reserve torque during the preparatory phase to be applied to the transmission during the torque phase. Transmission controls 502 communicate with vehicle controls 504 to provide a desired torque hole filling (THF) torque reserve 510. Actual motor torque is compared to, or subtracted from, a current maximum motor torque (which may vary based on operating conditions, such as a battery state of charge, for example) at 512 with the resulting motor torque subtracted from the reserve torque at 514 to determine an available motor torque. A lower limit of zero is applied to available motor torque at 516. The available motor torque is then added to the driver demand torque at 518. A shift energy management torque may be subtracted as also indicated at 518. Shift energy management torque may be applied to reduce shift shock under vehicle and ambient operating conditions. The resulting torque is then used to provide the requested base engine torque after being limited by maximum and minimum engine torque limits or thresholds at 520.

Actual engine torque is subtracted from driver demand torque at 530 with the result limited by maximum and minimum motor torque limits or thresholds at 532 with the result becoming the requested motor torque from motor 16. The torque from 532 is subtracted from the difference between driver demand torque and actual engine torque at 534, with that difference limited to a minimum of zero at 536. The available motor torque is added to the engine torque at 540 and limited ty the minimum instantaneous engine torque threshold at 542 to determine a requested instantaneous engine torque from engine 12.

As shown in the diagram of FIG. 5, the control strategy controls engine and motor torque to provide a reserve torque during the preparatory phase for torque hole filling during the torque phase. The strategy prioritizes the torque from the motor to provide the reserve torque. The algorithm also ensures to not apply spark retard to meet desired driver demand when the engine is used to generate partial reserve during the preparatory phase of the upshift.

As described above, a desired reserve torque $\tau_{THF}^{des}$ for torque hole filling is calculated by the transmission controller using any of a number of known strategies. Based on present motor torque and maximum motor torque limits for current operating conditions, available motor torque reserve is given 512 by:

$$\tau_{mtr}^{avail} = \tau_{mtr}^{max} - \tau_{mtr}^{actl} \tag{1}$$

and the engine portion of the reserve torque is then determined by the controller at 514, 516 according to:

$$\tau_{eng}^{THF} = \max(\tau_{des}^{THF} - \tau_{mtr}^{avail}, 0) \tag{2}$$

The engine portion of reserve torque will be zero if the available motor torque is capable of meeting the complete desired reserve torque.

A desired engine base torque is calculated at 518 based on driver requested torque and additional desired reserve torque according to:

$$\tau_{eng,base}^{des} = \tau_{dr}^{req} + \tau_{eng}^{THF} \tag{3}$$

where $\tau_{eng,base}^{des}$ is the desired base engine torque and $\tau_{dr}^{req}$ is the driver requested torque at the transmission input (impeller torque for transmissions having a torque converter). The desired driver demand in equation (3) includes any torque modification from the transmission controller 510. This desired engine base torque is further clipped or limited by engine maximum and minimum base torque limits or thresholds at 520 to provide a requested engine base torque $\tau_{eng,base}^{req}$ from engine 12. In equation (3), shift energy management torque $\tau_{EM}$ is assumed to be zero. Under some operating conditions, shift energy management torque may be desired and may be incorporated at 518 according to:

$$\tau_{eng,base}^{des} = \tau_{dr}^{req} - \tau_{EM} + \tau_{eng}^{THF} \tag{3.1}$$

A desired motor torque is calculated from actual engine torque and desired driver demand at 530 according to:

$$\tau_{mtr}^{des} = \tau_{dr}^{req} - \tau_{eng}^{act} \tag{4}$$

where $T_{mtr}^{des}$ is the desired motor torque and $T_{eng}^{act}$ the actual engine torque. Desired motor torque is further clipped or limited by the maximum and minimum motor torque limits at 532 to calculate requested motor torque $T_{mtr}^{req}$. These limits may include motor considerations (such as maximum current, temperature, speed, etc.) and battery considerations (such as current state of charge, minimum state of charge, battery current limits, etc.).

An additional torque reduction required from the engine is calculated based on desired motor torque and requested motor torque as indicated at 534. This additional torque reduction is clipped to zero at 536 as this is only for further torque reduction required from the engine according to:

$$\tau_{inst,addl} = \min(\tau_{mtr}^{des} - \tau_{mtr}^{req}, 0) \tag{5}$$

Desired engine instantaneous torque is calculated at 540 based on the requested base engine torque and additional torque reduction calculated above according to:

$$\tau_{eng,inst}^{des} = \tau_{eng,base}^{req} + \tau_{inst,addl} \tag{6}$$

The requested engine instantaneous torque $\tau_{eng,inst}^{req}$ is calculated by the controller at 542 by clipping this desired torque with engine maximum and minimum instantaneous torque limits.

Figure 6:
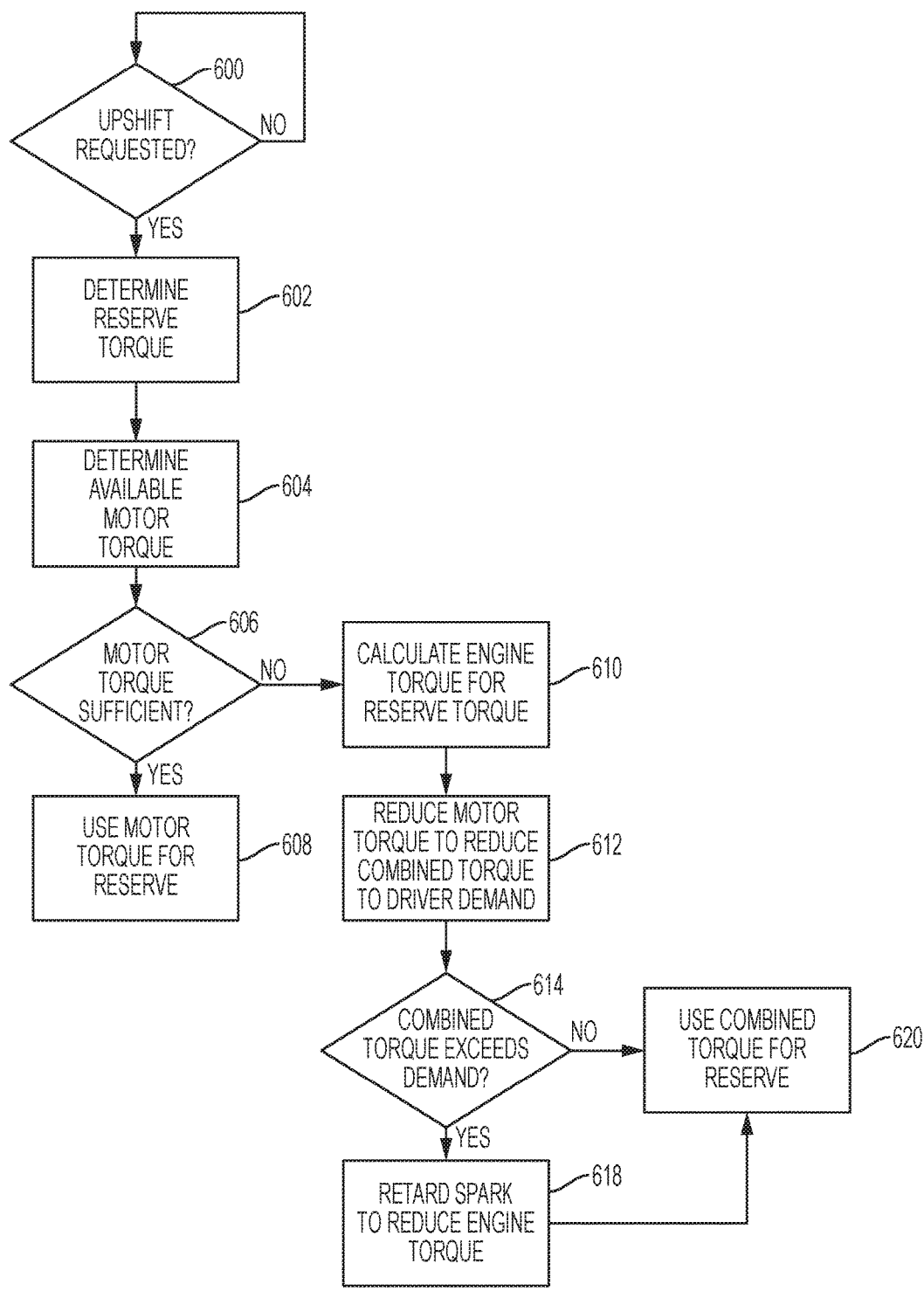
FIG. 6 is a flowchart illustrating operation of a control system or method in a hybrid vehicle for controlling motor torque and engine torque during an upshift for generating reserve torque that is applied to the transmission during the torque phase.

FIG. 6 is a flowchart illustrating operation of a control system or method in a hybrid vehicle for controlling motor torque and engine torque during an upshift for generating reserve torque that is applied to the transmission during the torque phase. Step 600 determines whether an upshift has been requested. If an upshift has been requested, step 602 determines a desired reserve torque for torque hole filling. The controller determines available motor torque at step 604 based on current motor torque and motor torque limits or thresholds that may change based on current operating conditions, such as motor temperature, battery state of charge, motor current, etc. If available motor torque is sufficient to satisfy the reserve torque as determined at 606, the controller increases motor torque to provide the reserve torque during the torque phase of the shift as indicated at 608. If available motor torque is insufficient to satisfy the reserve torque as indicated at 606, the controller calculates engine torque needed to satisfy the reserve torque as indicated at 610. The controller increases the engine torque and reduces motor torque to reduce combined engine and motor torque to a driver demand torque as indicated at 612. If combined engine and motor torque exceeds the driver demand torque after reducing the motor torque to a minimum torque threshold as indicated at 614, the controller retards spark to reduce engine torque during the preparatory phase as indicated at 618, with the resulting combined torque used for the reserve torque at 620. Otherwise, spark retard is not used to reduce the engine torque and the combined torque is used as indicated at 620.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Embodiments according to the present disclosure provide torque hole filling to reduce torque disturbances transmitted from the powertrain to the vehicle body during upshifts to reduce or eliminate undesirable shift shock. Limited use of engine spark retard may improve overall system efficiency and reduce feedgas emissions to the vehicle emission control system. Coordinated control of motor and engine torque during upshifts in a synchronized manner as disclosed and claimed may also improve shift quality and consistency.

While representative embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure or claims and may be desirable for particular applications.

What is claimed is:

1. A vehicle comprising:
   an engine;
   an electric machine selectively coupled to the engine by a first clutch;
   an automatic transmission selectively coupled to the electric machine by a second clutch; and
   a controller configured to control the engine and the electric machine during an upshift of the automatic transmission to generate a reserve torque during a preparatory phase of the upshift that is applied to the automatic transmission during a torque phase of the upshift, the controller:
   increasing electric machine torque to provide the reserve torque if available electric machine torque is sufficient to satisfy the reserve torque; and
   if available electric machine torque is insufficient to satisfy the reserve torque:
   increasing engine torque and reducing electric machine torque to reduce combined engine and electric machine torque to a driver demand torque; and
   retarding spark to reduce engine torque during the preparatory phase only if the combined engine and electric machine torque exceeds driver demand torque after reducing electric machine torque to a minimum torque threshold.

2. The vehicle of claim 1 further comprising a battery coupled to the electric machine, wherein the minimum torque threshold is based on a state of charge of the battery.

3. The vehicle of claim 1 wherein the minimum torque threshold is zero.

4. The vehicle of claim 1 wherein the automatic transmission comprises a step-ratio transmission.

5. The vehicle of claim 1 wherein the increasing engine torque comprises increasing engine torque to the reserve torque less a shift energy management torque.

6. The vehicle of claim 1 wherein the second clutch comprises a torque converter bypass clutch disposed within a torque converter of the automatic transmission.

7. The vehicle of claim 1 further comprising a starter motor coupled to the engine and configured to crank the engine during starting.

8. A vehicle comprising:
   a motor disposed between an engine and a transmission; and
   a controller configured to control motor and engine torque during an upshift to generate a reserve torque during a preparatory phase applied to the transmission during a torque phase of the upshift, the controller increasing engine torque for the reserve torque when available motor torque is insufficient, and decreasing motor torque such that combined engine and motor torque satisfy driver demanded torque.

9. The vehicle of claim 8 wherein the controller is further configured to decrease engine torque using spark retard during the preparatory phase only if the combined engine and motor torque exceeds the driver demanded torque after decreasing the motor torque to a minimum motor torque.

10. The vehicle of claim 8 wherein the controller is further configured to reduce the engine torque by a shift energy management torque during the torque phase.

11. The vehicle of claim 8 wherein the controller is further configured to increase engine torque for the reserve torque only if the available motor torque is insufficient to satisfy the reserve torque.

12. The vehicle of claim 8 further comprising a first clutch disposed between the engine and the motor and a second clutch disposed between the motor and the transmission.

13. The vehicle of claim 12 wherein the transmission comprises a torque converter and the second clutch comprises a torque converter bypass clutch.

14. The vehicle of claim 8 further comprising a battery, wherein the available motor torque is based on a state of charge of the battery.

15. A method for controlling a vehicle having a motor connected between an engine and a transmission, comprising, by a controller:

increasing engine torque for reserve torque to be applied during a torque phase of an upshift responsive to available motor torque being insufficient to satisfy the reserve torque, and reducing engine torque by retarding spark only if combined engine torque and motor torque exceeds driver demand torque after reducing motor torque to a minimum threshold.

16. The method of claim 15 wherein the minimum threshold is zero.

17. The method of claim 15 further comprising reducing the engine torque by a shift energy management torque during the torque phase.

18. The method of claim 15 wherein the available motor torque corresponds to a battery state of charge.

19. The method of claim 15 wherein the controller increases the engine torque for the reserve torque based on the available motor torque.

20. The method of claim 15 wherein the available motor torque corresponds to a maximum available motor torque less a currently commanded motor torque.

* * * * *